United States Patent
Delaney, Jr. et al.

(10) Patent No.: US 10,526,429 B2
(45) Date of Patent: Jan. 7, 2020

(54) HYDROBORATION/OXIDATION OF ALLYL-TERMINATED POLYISOBUTYLENE

(71) Applicant: Cardiac Pacemakers, Inc., St. Paul, MN (US)

(72) Inventors: Joseph T. Delaney, Jr., Minneapolis, MN (US); Andrew J. Ro, Maple Grove, MN (US); Patrick Willoughby, Shoreview, MN (US); Niraj Gurung, Sauk Rapids, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 59 days.

(21) Appl. No.: 15/914,409

(22) Filed: Mar. 7, 2018

(65) Prior Publication Data

US 2018/0258196 A1    Sep. 13, 2018

Related U.S. Application Data

(60) Provisional application No. 62/468,316, filed on Mar. 7, 2017.

(51) Int. Cl.
*C08F 8/06* (2006.01)
*C08F 8/42* (2006.01)

(52) U.S. Cl.
CPC . *C08F 8/06* (2013.01); *C08F 8/42* (2013.01)

(58) Field of Classification Search
CPC ...... C08F 30/06; C08F 130/06; C08F 230/06; C08F 110/10; C08J 2300/103
See application file for complete search history.

(56) References Cited

U.S. PATENT DOCUMENTS

| | | | |
|---|---|---|---|
| 2,182,513 | A | 12/1939 | Buckeridge |
| 2,202,877 | A | 6/1940 | Stevens et al. |
| 2,240,558 | A | 5/1941 | Carleton |
| 2,451,420 | A | 10/1948 | Watkins |
| 2,463,452 | A | 3/1949 | Yule |

(Continued)

FOREIGN PATENT DOCUMENTS

| | | |
|---|---|---|
| BR | 9003841 A | 2/1992 |
| CA | 2278680 A1 | 8/1998 |

(Continued)

OTHER PUBLICATIONS

Claiborne, T. E., Slepian, M. J., Hossainy, S., & Bluestein, D. (2013). Polymeric trileaflet prosthetic heart valves: evolution and path to clinical reality. Expert Rev Med Devices., 9(6):577-594.

(Continued)

*Primary Examiner* — Mark S Kaucher
(74) *Attorney, Agent, or Firm* — Faegre Baker Daniels LLP

(57) ABSTRACT

A method for making a polyisobutylene diol from a polyisobutylene diallyl. The method includes hydroborating the polyisobutylene diallyl to produce a polyisobutylene dialkyl borane, and oxidizing the polyisobutylene dialkyl borane to form the polyisobutylene diol. The polyisobutylene diallyl is hydroborated by combining in situ the polyisobutylene diallyl with a borane-coordinating solvent, an alkaline metal salt of borohydride, and an acid. The alkaline metal salt of borohydride is combined with the polyisobutylene diallyl before the acid is combined with the polyisobutylene diallyl.

14 Claims, 4 Drawing Sheets

(56) References Cited

U.S. PATENT DOCUMENTS

| | | |
|---|---|---|
| 3,069,236 A | 12/1962 | Schultz et al. |
| 3,148,028 A | 9/1964 | Schultz et al. |
| 3,328,372 A | 6/1967 | Thomas et al. |
| 3,427,366 A | 2/1969 | Verdol et al. |
| 3,505,252 A | 4/1970 | Brotherton et al. |
| 3,642,964 A | 2/1972 | Rausch et al. |
| 3,755,265 A | 8/1973 | Fletcher et al. |
| 3,815,611 A | 6/1974 | Denniston, III |
| 3,966,624 A | 6/1976 | Duling et al. |
| 4,043,331 A | 8/1977 | Martin et al. |
| 4,103,079 A | 7/1978 | Thaler |
| 4,118,427 A | 10/1978 | Rhein et al. |
| 4,154,913 A | 5/1979 | Hergenrother et al. |
| 4,157,429 A | 6/1979 | Hergenrother et al. |
| 4,157,430 A | 6/1979 | Hergenrother et al. |
| 4,230,509 A | 10/1980 | Tulis et al. |
| 4,276,394 A | 6/1981 | Kennedy et al. |
| 4,304,771 A | 12/1981 | Suh et al. |
| 4,316,973 A | 2/1982 | Kennedy |
| 4,342,849 A | 8/1982 | Kennedy |
| 4,352,359 A | 10/1982 | Larimore et al. |
| 4,374,276 A | 2/1983 | Boden et al. |
| 4,404,297 A | 9/1983 | Fishler et al. |
| 4,420,411 A | 12/1983 | Boden et al. |
| 4,423,185 A | 12/1983 | Matsumoto et al. |
| 4,425,264 A | 1/1984 | Boden et al. |
| 4,430,233 A | 2/1984 | Boden et al. |
| 4,477,604 A | 10/1984 | Oechsle, III |
| 4,484,586 A | 11/1984 | McMickle et al. |
| 4,486,572 A | 12/1984 | Kennedy |
| 4,518,615 A | 5/1985 | Cherukuri et al. |
| 4,539,996 A | 9/1985 | Engel |
| 4,570,270 A | 2/1986 | Oechsle, III |
| 4,675,361 A | 6/1987 | Ward |
| 4,686,137 A | 8/1987 | Ward, Jr. et al. |
| 4,752,626 A | 6/1988 | Hoye et al. |
| 4,767,885 A | 8/1988 | Kennedy |
| 4,771,082 A | 9/1988 | Solodovnik et al. |
| 4,861,830 A | 8/1989 | Ward |
| 4,880,883 A | 11/1989 | Grasel et al. |
| 4,888,389 A | 12/1989 | Kennedy et al. |
| 4,906,673 A | 3/1990 | Mori |
| 4,910,321 A | 3/1990 | Kennedy et al. |
| 4,928,689 A | 5/1990 | Hauser |
| 4,939,184 A | 7/1990 | Kennedy |
| 4,982,038 A | 1/1991 | Kimble et al. |
| 5,000,875 A | 3/1991 | Kolouch |
| 5,017,664 A | 5/1991 | Grasel |
| 5,026,814 A | 6/1991 | Re et al. |
| 5,029,585 A | 7/1991 | Lieber et al. |
| 5,090,422 A | 2/1992 | Dahl et al. |
| 5,103,837 A | 4/1992 | Weidlich et al. |
| 5,120,813 A | 6/1992 | Ward |
| 5,129,404 A | 7/1992 | Spehr et al. |
| 5,149,739 A | 9/1992 | Lee |
| 5,152,299 A | 10/1992 | Soukup |
| 5,171,760 A | 12/1992 | Kaszas et al. |
| 5,194,505 A | 3/1993 | Brugel |
| 5,212,248 A | 5/1993 | Knoll et al. |
| 5,269,810 A | 12/1993 | Hull et al. |
| 5,282,844 A | 2/1994 | Stokes et al. |
| 5,322,520 A | 6/1994 | Milder |
| 5,324,324 A | 6/1994 | Vachon et al. |
| 5,330,520 A | 7/1994 | Maddison et al. |
| 5,332,791 A | 7/1994 | Knoll et al. |
| 5,332,798 A | 7/1994 | Ferreri et al. |
| 5,340,881 A | 8/1994 | Kennedy et al. |
| 5,385,579 A | 1/1995 | Helland |
| 5,428,123 A | 6/1995 | Ward et al. |
| 5,433,730 A | 7/1995 | Alt |
| 5,442,010 A | 8/1995 | Hauenstein et al. |
| 5,442,015 A | 8/1995 | Kennedy et al. |
| 5,476,496 A | 12/1995 | Strandberg et al. |
| 5,554,178 A | 9/1996 | Dahl et al. |
| 5,559,067 A | 9/1996 | Lerner et al. |
| 5,585,444 A * | 12/1996 | Blackborow ........... C07C 29/52 525/333.7 |
| 5,589,563 A | 12/1996 | Ward et al. |
| 5,609,622 A | 3/1997 | Soukup et al. |
| 5,630,844 A | 5/1997 | Dogan et al. |
| 5,637,647 A | 6/1997 | Faust |
| 5,663,234 A | 9/1997 | Kennedy et al. |
| 5,665,823 A | 9/1997 | Saxena et al. |
| 5,677,386 A | 10/1997 | Faust |
| 5,681,514 A | 10/1997 | Woody |
| 5,741,331 A | 4/1998 | Pinchuk |
| 5,753,764 A | 5/1998 | Boutevin et al. |
| 5,755,762 A | 5/1998 | Bush |
| 5,766,527 A | 6/1998 | Schildgen et al. |
| 5,837,313 A | 11/1998 | Ding et al. |
| 5,849,415 A | 12/1998 | Shalaby et al. |
| 5,852,118 A | 12/1998 | Horrion et al. |
| 5,853,652 A | 12/1998 | Schildgen et al. |
| 5,861,023 A | 1/1999 | Vachon |
| 5,874,484 A | 2/1999 | Dirckx et al. |
| 5,886,089 A | 3/1999 | Knowlton |
| 5,898,057 A | 4/1999 | Chiang et al. |
| 5,902,329 A | 5/1999 | Hoffmann et al. |
| 5,912,302 A | 6/1999 | Gadkari et al. |
| 5,931,862 A | 8/1999 | Carson |
| 5,987,746 A | 11/1999 | Williams |
| 5,991,667 A | 11/1999 | Feith |
| 6,005,051 A | 12/1999 | Kennedy et al. |
| 6,010,715 A | 1/2000 | Wick et al. |
| 6,072,003 A | 6/2000 | Horrion et al. |
| 6,087,454 A | 7/2000 | Vanhaeren et al. |
| 6,093,197 A | 7/2000 | Bakula et al. |
| 6,117,554 A | 9/2000 | Shalaby et al. |
| 6,194,487 B1 | 2/2001 | Morimoto et al. |
| 6,200,589 B1 | 3/2001 | Kennedy et al. |
| 6,228,945 B1 | 5/2001 | Kennedy et al. |
| 6,236,893 B1 | 5/2001 | Thong |
| 6,242,058 B1 | 6/2001 | Bahadur et al. |
| 6,253,110 B1 | 6/2001 | Brabec et al. |
| 6,256,541 B1 | 7/2001 | Heil et al. |
| 6,284,682 B1 | 9/2001 | Troczynski et al. |
| 6,361,780 B1 | 3/2002 | Ley et al. |
| 6,363,286 B1 | 3/2002 | Zhu et al. |
| 6,365,674 B1 | 4/2002 | Kaufhold et al. |
| 6,426,114 B1 | 7/2002 | Troczynski et al. |
| 6,436,136 B1 | 8/2002 | Flodin et al. |
| 6,444,334 B1 | 9/2002 | Doi et al. |
| 6,545,097 B2 | 4/2003 | Pinchuk et al. |
| 6,555,619 B1 | 4/2003 | Kennedy et al. |
| 6,600,956 B2 | 7/2003 | Maschino et al. |
| 6,627,724 B2 | 9/2003 | Meijs et al. |
| 6,653,365 B2 | 11/2003 | Jia |
| 6,703,433 B1 | 3/2004 | Bahadur et al. |
| 6,706,779 B2 | 3/2004 | Bahadur et al. |
| 6,709,514 B1 | 3/2004 | Hossainy |
| 6,730,324 B2 | 5/2004 | Troczynski et al. |
| 6,770,325 B2 | 8/2004 | Troczynski et al. |
| 6,808,766 B1 | 10/2004 | Miyama et al. |
| 6,827,881 B2 | 12/2004 | Molnar et al. |
| 6,849,667 B2 | 2/2005 | Haseyama et al. |
| 6,852,794 B2 | 2/2005 | Puhala et al. |
| 6,869,466 B2 | 3/2005 | Day et al. |
| 6,870,024 B2 | 3/2005 | Haubennestel et al. |
| 6,889,092 B2 | 5/2005 | Zhu et al. |
| 6,896,965 B1 | 5/2005 | Hossainy |
| 7,013,182 B1 | 3/2006 | Krishnan |
| 7,065,411 B2 | 6/2006 | Verness |
| 7,101,956 B2 | 9/2006 | Benz et al. |
| 7,105,622 B2 | 9/2006 | Kennedy et al. |
| 7,115,300 B1 | 10/2006 | Hossainy |
| 7,119,138 B1 | 10/2006 | Feeney et al. |
| 7,160,941 B2 | 1/2007 | Jin et al. |
| 7,174,221 B1 | 2/2007 | Chen et al. |
| 7,180,172 B2 | 2/2007 | Sethumadhavan et al. |
| 7,196,142 B2 | 3/2007 | Kennedy et al. |
| 7,231,259 B2 | 6/2007 | Jenney et al. |
| 7,247,364 B2 | 7/2007 | Hossainy et al. |
| 7,279,175 B2 | 10/2007 | Chen et al. |
| 7,280,875 B1 | 10/2007 | Chitre et al. |

(56) References Cited

U.S. PATENT DOCUMENTS

| | | |
|---|---|---|
| 7,289,856 B1 | 10/2007 | Karicherla |
| 7,292,890 B2 | 11/2007 | Whitehurst et al. |
| 7,347,751 B2 | 3/2008 | Sweeney et al. |
| 7,358,306 B2 | 4/2008 | Turri et al. |
| D579,758 S | 11/2008 | Tanaka et al. |
| 7,465,777 B2 | 12/2008 | Zoromski et al. |
| 7,470,728 B2 | 12/2008 | Jia et al. |
| 7,501,179 B2 | 3/2009 | Song et al. |
| 7,504,052 B2 | 3/2009 | Ehbing et al. |
| 7,553,546 B1 | 6/2009 | Tan |
| 7,572,515 B2 | 8/2009 | Sethumadhavan et al. |
| 7,617,004 B2 | 11/2009 | Bartels et al. |
| 7,715,922 B1 | 5/2010 | Tan |
| 7,727,541 B2 | 6/2010 | Richard et al. |
| 7,756,589 B2 | 7/2010 | Krishnan |
| 7,820,769 B2 | 10/2010 | Seifalian et al. |
| 7,825,199 B1 | 11/2010 | Matyjaszewski et al. |
| 7,881,808 B2 | 2/2011 | Borgaonkar et al. |
| 7,979,142 B2 | 7/2011 | Krishnan |
| 8,034,874 B2 | 10/2011 | Strickler et al. |
| 8,075,906 B2 | 12/2011 | Richard et al. |
| 8,163,826 B2 | 4/2012 | Willberg et al. |
| 8,304,471 B2 | 11/2012 | Joseph et al. |
| 8,304,482 B2 | 11/2012 | Joseph et al. |
| 8,324,290 B2 | 12/2012 | Desai et al. |
| 8,349,123 B2 | 1/2013 | Zhang et al. |
| 8,372,468 B2 | 2/2013 | Desai et al. |
| 8,374,704 B2 | 2/2013 | Desai et al. |
| 8,394,393 B2 | 3/2013 | Mather et al. |
| 8,501,831 B2 | 8/2013 | Desai et al. |
| D689,734 S | 9/2013 | Bock |
| 8,529,934 B2 | 9/2013 | Desai et al. |
| 8,644,952 B2 | 2/2014 | Desai et al. |
| 8,660,663 B2 | 2/2014 | Wolf et al. |
| 8,676,344 B2 | 3/2014 | Desai et al. |
| 8,765,238 B2 | 7/2014 | Atanasoska et al. |
| 8,889,926 B2 | 11/2014 | Kennedy et al. |
| 8,903,507 B2 | 12/2014 | Desai et al. |
| 8,927,660 B2 | 1/2015 | Desai et al. |
| 8,962,785 B2 | 2/2015 | Faust et al. |
| 8,969,424 B2 | 3/2015 | Lin |
| 9,574,043 B2 | 2/2017 | Faust et al. |
| 9,655,720 B2 | 5/2017 | Bluestein et al. |
| 9,926,399 B2 | 3/2018 | Faust et al. |
| 2002/0012694 A1 | 1/2002 | Moo-Young et al. |
| 2002/0022826 A1 | 2/2002 | Reynolds et al. |
| 2002/0138123 A1 | 9/2002 | Casas-Bejar et al. |
| 2003/0031699 A1 | 2/2003 | Van Antwerp |
| 2003/0055179 A1* | 3/2003 | Ota .................. B32B 27/32 525/242 |
| 2003/0073961 A1 | 4/2003 | Happ |
| 2003/0093136 A1 | 5/2003 | Osypka et al. |
| 2003/0125499 A1 | 7/2003 | Benz et al. |
| 2003/0204022 A1* | 10/2003 | Kennedy ............ C08F 293/005 525/242 |
| 2004/0037886 A1 | 2/2004 | Hsu |
| 2004/0054210 A1 | 3/2004 | Benz et al. |
| 2004/0059402 A1 | 3/2004 | Soukup et al. |
| 2004/0063805 A1 | 4/2004 | Pacetti et al. |
| 2004/0068036 A1 | 4/2004 | Halladay et al. |
| 2004/0143255 A1 | 7/2004 | Vanney et al. |
| 2004/0175558 A1 | 9/2004 | El-Nounou et al. |
| 2004/0186545 A1 | 9/2004 | Rosero et al. |
| 2004/0193139 A1 | 9/2004 | Armstrong et al. |
| 2004/0198901 A1 | 10/2004 | Graham et al. |
| 2005/0031874 A1 | 2/2005 | Michal et al. |
| 2005/0037050 A1 | 2/2005 | Weber |
| 2005/0060022 A1 | 3/2005 | Felt et al. |
| 2005/0070985 A1 | 3/2005 | Knapp et al. |
| 2005/0079199 A1 | 4/2005 | Heruth et al. |
| 2005/0080470 A1 | 4/2005 | Westlund et al. |
| 2005/0180919 A1 | 8/2005 | Tedeschi |
| 2005/0288476 A1 | 12/2005 | Yilgor et al. |
| 2006/0047083 A1 | 3/2006 | Yilgor et al. |
| 2006/0047098 A1 | 3/2006 | Anna et al. |
| 2006/0135721 A1* | 6/2006 | Lange .................. C08F 10/10 526/348.7 |
| 2006/0142503 A1* | 6/2006 | Lang .................. C08F 8/42 525/333.7 |
| 2006/0223946 A1 | 10/2006 | Faust et al. |
| 2006/0235499 A1 | 10/2006 | Heil, Jr. et al. |
| 2006/0264577 A1 | 11/2006 | Faust et al. |
| 2007/0051531 A1 | 3/2007 | Borgaonkar et al. |
| 2007/0093604 A1 | 4/2007 | Kennedy et al. |
| 2007/0106144 A1 | 5/2007 | Squeri |
| 2007/0128246 A1 | 6/2007 | Hossainy et al. |
| 2007/0151531 A1 | 7/2007 | Masaoka et al. |
| 2007/0190104 A1 | 8/2007 | Kamath et al. |
| 2007/0190108 A1 | 8/2007 | Datta et al. |
| 2007/0190319 A1 | 8/2007 | Kalayci |
| 2007/0203302 A1 | 8/2007 | Kennedy et al. |
| 2007/0282411 A1 | 12/2007 | Franz et al. |
| 2008/0008739 A1 | 1/2008 | Hossainy et al. |
| 2008/0009939 A1 | 1/2008 | Gueriguian et al. |
| 2008/0051866 A1 | 2/2008 | Chen et al. |
| 2008/0095918 A1 | 4/2008 | Kleiner et al. |
| 2008/0167423 A1 | 7/2008 | Richards et al. |
| 2008/0167710 A1 | 7/2008 | Dave et al. |
| 2008/0311173 A1 | 12/2008 | Schwarz et al. |
| 2009/0054961 A1 | 2/2009 | Borgaonkar et al. |
| 2009/0187162 A1 | 7/2009 | Ohara et al. |
| 2009/0292094 A1 | 11/2009 | Larichev et al. |
| 2009/0326077 A1 | 12/2009 | Desai et al. |
| 2010/0023104 A1 | 1/2010 | Desai et al. |
| 2010/0025703 A1 | 2/2010 | Towns et al. |
| 2010/0055470 A1 | 3/2010 | Klun et al. |
| 2010/0069578 A1 | 3/2010 | Faust et al. |
| 2010/0075018 A1 | 3/2010 | Desai et al. |
| 2010/0107967 A1 | 5/2010 | Tanaka et al. |
| 2010/0179298 A1 | 7/2010 | Faust et al. |
| 2010/0241204 A1 | 9/2010 | Scheuermann |
| 2010/0241208 A1 | 9/2010 | Pinchuk |
| 2010/0241209 A1 | 9/2010 | Krishnan |
| 2010/0249296 A1 | 9/2010 | Kimura et al. |
| 2010/0267897 A1 | 10/2010 | Kennedy et al. |
| 2011/0045030 A1 | 2/2011 | Desai et al. |
| 2011/0051581 A1 | 3/2011 | Janik et al. |
| 2011/0054580 A1 | 3/2011 | Desai et al. |
| 2011/0054581 A1 | 3/2011 | Desai et al. |
| 2011/0087317 A1 | 4/2011 | Borgaonkar et al. |
| 2011/0152989 A1 | 6/2011 | Tan |
| 2011/0213084 A1 | 9/2011 | Kennedy et al. |
| 2012/0077934 A1 | 3/2012 | Faust et al. |
| 2012/0158107 A1 | 6/2012 | Wolf et al. |
| 2012/0259069 A1 | 10/2012 | Kennedy et al. |
| 2012/0309661 A1 | 12/2012 | Adams et al. |
| 2013/0013040 A1 | 1/2013 | Desai et al. |
| 2013/0041108 A1 | 2/2013 | Kennedy et al. |
| 2013/0041442 A1 | 2/2013 | Arnholt et al. |
| 2013/0079487 A1 | 3/2013 | Faust et al. |
| 2013/0122185 A1 | 5/2013 | Desai et al. |
| 2013/0131765 A1 | 5/2013 | Polkinghorne et al. |
| 2013/0330390 A1 | 12/2013 | Pacetti |
| 2013/0331538 A1 | 12/2013 | Kennedy et al. |
| 2014/0074201 A1 | 3/2014 | Arnholt et al. |
| 2014/0088218 A1 | 3/2014 | Desai et al. |
| 2014/0144580 A1 | 5/2014 | Desai et al. |
| 2014/0194963 A1 | 7/2014 | Desai et al. |
| 2015/0274876 A1 | 10/2015 | Faust |
| 2016/0008607 A1* | 1/2016 | Kane .................. A61N 1/3754 607/116 |
| 2016/0024340 A1 | 1/2016 | Rukavina |
| 2016/0145362 A1* | 5/2016 | Wettling .............. C08F 210/10 525/138 |
| 2016/0311983 A1 | 10/2016 | Delaney et al. |
| 2017/0137558 A1 | 5/2017 | Faust et al. |
| 2017/0174845 A1 | 6/2017 | Delaney, Jr. et al. |

(56) References Cited

U.S. PATENT DOCUMENTS

| | | |
|---|---|---|
| 2017/0327622 A1 | 11/2017 | Delaney et al. |
| 2018/0208698 A1 | 7/2018 | Faust et al. |

FOREIGN PATENT DOCUMENTS

| | | |
|---|---|---|
| CN | 1221430 A | 6/1999 |
| CN | 1248606 A | 4/2006 |
| CN | 102131530 A | 7/2011 |
| CN | 102365308 A | 2/2012 |
| CN | 102712808 A | 10/2012 |
| CN | 104231207 A | 12/2014 |
| CN | 104520345 A | 4/2015 |
| CN | ZL2010800475975 B | 4/2015 |
| CN | 104592850 A | 5/2015 |
| CN | 104602888 A | 5/2015 |
| CN | 104610902 A | 5/2015 |
| DE | 19610350 A1 | 9/1997 |
| EP | 0153520 A1 | 9/1985 |
| EP | 0259492 A1 | 3/1988 |
| EP | 0610714 A2 | 8/1994 |
| EP | 0732349 A2 | 9/1996 |
| EP | 0837097 A1 | 4/1998 |
| EP | 1061092 A1 | 12/2000 |
| EP | 1489109 A2 | 12/2004 |
| EP | 2006328 A1 | 12/2008 |
| EP | 2922888 A2 | 9/2015 |
| JP | 02088614 A | 3/1990 |
| JP | 4154815 A | 5/1992 |
| JP | 6345821 A | 12/1994 |
| JP | 7102017 A | 4/1995 |
| JP | 7330591 A | 12/1995 |
| JP | 07331223 A | 12/1995 |
| JP | 1087726 A | 4/1998 |
| JP | 11131325 A | 5/1999 |
| JP | 2000169814 A | 6/2000 |
| JP | 2001011319 A | 1/2001 |
| JP | 2001040064 A | 2/2001 |
| JP | 2001131879 A | 5/2001 |
| JP | 2002348317 A | 12/2002 |
| JP | 2003137951 A | 5/2003 |
| JP | 2004204181 A | 7/2004 |
| JP | 2006515795 A | 6/2006 |
| JP | 2008238761 A | 10/2008 |
| JP | 2009132832 A | 6/2009 |
| JP | 2009535182 A | 10/2009 |
| JP | 2009540873 A | 11/2009 |
| JP | 2011526326 A | 10/2011 |
| JP | 2012515231 A | 7/2012 |
| JP | 2012519053 A | 8/2012 |
| JP | 2013502495 A | 1/2013 |
| JP | 2014533580 A | 12/2014 |
| JP | 2015523192 A | 8/2015 |
| WO | WO1987004625 A1 | 8/1987 |
| WO | WO9316131 A1 | 8/1993 |
| WO | WO1993022360 A1 | 11/1993 |
| WO | WO1995026993 A1 | 10/1995 |
| WO | WO1997000293 A1 | 1/1997 |
| WO | WO9707161 A1 | 2/1997 |
| WO | WO1997047664 A1 | 12/1997 |
| WO | WO1998033832 A1 | 8/1998 |
| WO | WO1998034678 A1 | 8/1998 |
| WO | 1999051656 A1 | 10/1999 |
| WO | WO200213785 A2 | 2/2002 |
| WO | WO2003042273 A1 | 5/2003 |
| WO | WO2004014453 A1 | 2/2004 |
| WO | WO2004044012 A1 | 5/2004 |
| WO | WO2004113400 A2 | 12/2004 |
| WO | WO2005035655 A1 | 4/2005 |
| WO | WO2006011647 A1 | 10/2006 |
| WO | WO2006110647 A1 | 10/2006 |
| WO | WO2007030722 A1 | 3/2007 |
| WO | WO2007117566 A2 | 10/2007 |
| WO | WO2007119687 A1 | 10/2007 |
| WO | 2007130900 A2 | 11/2007 |
| WO | WO2007126806 A1 | 11/2007 |
| WO | WO2008060333 A1 | 5/2008 |
| WO | WO2008066914 A1 | 6/2008 |
| WO | WO2008112190 A1 | 9/2008 |
| WO | WO2008127730 A1 | 10/2008 |
| WO | WO2008156806 A1 | 12/2008 |
| WO | WO2009051945 A1 | 4/2009 |
| WO | WO2009058397 A1 | 5/2009 |
| WO | WO2009158600 A1 | 12/2009 |
| WO | WO2009158609 A1 | 12/2009 |
| WO | WO2010039986 A1 | 4/2010 |
| WO | WO2010078552 A1 | 7/2010 |
| WO | WO2010081132 A1 | 7/2010 |
| WO | 2010107530 A2 | 9/2010 |
| WO | WO2010111280 A1 | 9/2010 |
| WO | 2010135418 A2 | 11/2010 |
| WO | WO2011022583 A1 | 2/2011 |
| WO | WO2011060161 A1 | 5/2011 |
| WO | 2012093597 A1 | 7/2012 |
| WO | WO2013192186 A1 | 12/2013 |
| WO | 2014018509 A1 | 1/2014 |
| WO | 2014081916 A2 | 5/2014 |
| WO | WO2015007553 A1 | 1/2015 |
| WO | 2016007367 A1 | 1/2016 |
| WO | 2017106774 A1 | 6/2017 |
| WO | 2017127642 A1 | 7/2017 |

OTHER PUBLICATIONS

International Preliminary Report on Patentability issued in PCT/US2017/031856, 7 pages.

International Search Report and Written Opinion issued in PCT/US2018/046813, dated Dec. 11, 2018, 11 pages.

Motte, S., & Kaufman, L. J. (2012). Strain stiffening in collagen I Networks. Biopolymers, 99(1):35-46.

Prucker, O., et al. Photochemical Attachment of Polymer Films to Solid Surfaces via Monolayers of Benzophenone Derivatives. J. Am. Chem. Soc. 121:8766-8770, 1999.

"Butyl Rubber Properties and Applications", downloaded form URL: hiit://ww.iisrp.com/WebPolymers/02ButylRubberIIR.pdf availale on the internet on Jul. 31, 2007 according to Wayback Web Archive.

Ako, Masayuke et al., "Polyisobutylene-based urethane foams I. Comparative reactivities of hydroxyl-terminated polyisobutylene-diols and -triols and other hydroxyl-capped polyols with isocyanate", Polymer Bulletin 19(2), 137-143 (1988).

Ako, Masayuke et al., "Polyisobutylene-based urethane foams II. Synthesis and properties of novel polyisobutylene-based flexible polyurethane foams", Journal of Applied Polymer Science, vol. 37(5), Feb. 5, 1989, pp. 1351-1361.

Bacaloglu, R. and Cotarca, L. "Reactions of Aryl Isocyanates with Alcohols in the Presence Ob Tertiary Amines." Journal f. prakt. Chemie. , 330(4):530-540.

Bela et al., Living Carbocation Polymerization. XX. Synthesis of Allyl-Telechelic Polyisobutylenes by One-Pot Polymerization-Functionalization polymer. Mater. Sci. Eng. 1988; 58:869-872.

Chang, Victor S.C. et al. "Gas Permeability, Water Absorption, Hydrolytic Stability and Air-Oven Aging of Polyisobutylene-Based Polyurethane Networks", Polymer Bulletin 8(2-3-4), 69-74 (1982).

Chen, Chi-Chang et al., "Solid Polymer Electrolytes III Preparation, Characterization, and Ionic Conductivity of New Gelled Polymer Electrolytes Based on Segmented, Perfluoropolyether-Modified Polyurethane", Journal of Polymer Science: Part A: Polymer Chemistry, vol. 40, pp. 486-495 (2002).

Chen, D., et. al. Amphiphilic Networks: 11. Biocompatibility and Controlled Drug Release of Poly[Isobutylene-co-2-(dimethylamino)Ethyl Methacrylate]. J. of Biomedical Materials Research, 23:1327-1342, 1989.

Chen, T. K., et. al. Glass Transition Behaviors of a Polyurethane Hard Segment based on 4, 4'-Diisocyanatodiphenylmethane and 1,4-Butanediol and the Calculation of Microdomain Composition. Macromolecules, 30:5068-5074, 1997.

Cho, J. C., et. al. Synthesis, Characterization, Properties, and Drug Release of Poly(Alkyl Methacrylate-B-Isobutylene-B-Alkyl Methacrylate). Biomacromolecules, 7:2997-3007, 2006.

(56) References Cited

OTHER PUBLICATIONS

Choi, T., et. al. Segmented Polyurethanes Derived from Novel Siloxane—Carbonate Soft Segments for Biomedical Applications. Journal of Polymer Science Part B: Polymer Physics, 49:865-872, 2011.
Christenson, E. M., et. al. Oxidative Mechanisms of Poly(Carbonate Urethane) and Poly(Ether Urethane) Biodegradation: In Vivo and In Vitro Correlations. J. Biomed. Mater. Res., 70A:245-255, 2004.
Communication in Cases for Which No Other Form is Applicable, issued in PCT/US2013/053448, dated Jul. 28, 2014, 1 page.
Cozzens, David et al. Long Term in Vitro Biostability of Segmented Polyisobutylene-Based Thermoplastic Polyurethanes. Journal of Biomedicals Materials Research Journal, Part A, 774-782, 2010.
De, Priyadarsi et al., "Carbocationic Polymerization of Isobutylene Using Methylaluminum Bromide Coinitiators: Synthesis of Bromoally Functional Polyisobutylene" Macromolecules, Oct. 2006, 39(2), 7527-7533.
De, Priyadarsi et al., "Relative Reactivity of C4 Olefins toward the Polyisobutylene Cation" Macromolecules 2006, 39, 6870-6861.
Erdodi, G., et al., "Polyisobutylene-Based Polyurethanes. III. Polyurethanes Containing PIB/PTMO Soft Co-Segments," J. Polym. Sci., Part A: Polym. Chem, 47:5278-5290 (2009).
Erdodi, G., et al., "Polyisobutylene-Based Polyurethanes. VI. Unprecedented Combination of Mechanical Properties and Oxidative/Hydrolytic Stability by H-Bond Acceptor Chain Extenders" J. Polym. Sci., Part A: Polym. Chem, 48:2361-2371 (2010).
Examination Report and Search Report for Chinese Application No. 201380042582.3, dated Dec. 4, 2015, consisting of 6 pages.
Extended European Search Report issued in EP appln. 16206626.0, dated Apr. 25, 2017, 8 pages.
Fan, L., et. al. The Absolute Calibration of a Small-Angle Scattering Instrument with a Laboratory X-ray Source. XIV International Conference on Small-Angle Scattering (SAS09), Journal of Physics: Conference Series 247, 11 pages, 2010.
Faust, R. et al., "Method to Prepare Block Copolymers by the Combination of Cationic and Anionic Polymerization", U.S. Appl. No. 12/225,905, filed on Apr. 5, 2007.
Fischer, Stefan; et al. "Synthesis and Biological Evaluation of Bromo- and Fluorodanicalipin A." Angew. Chem. Int. Ed. 2016, 55, 2555-2558.
Gadkari A. et al., "Preparation and biocompatibility of Novel Polar-Nonpolar Networks. Osynthesis, Characterization and Histological-Bacterial Analysis of Mixed Polytetrahydrofuran-Polyisobutylene Networks", Polymer Bulletin, vol. 22, No. 1, Jul. 1, 1989, pp. 25-32.
Georgiou, Theoni K; et al. "Amphiphilic Model Conetworks of Polyisobutylene Methacrylate and 2-(Dimethylamino) ethyl Methacrylate Prepared by the Combination of Quasiliving Carbocationic and Group Transfer Polymerizations." Macromolecules 2007, 40, 2335-2343.
Giusti, Paolo et al., "Synthesis and Characterization of New potentially Hemocompatible Thermoplastic Elastomers", p. 371, Abstract.
Gunatillake, P. A., et. al. Synthesis and Characterization of a Series of Poly(alkylene carbonate) Macrodiols and the Effect of Their Structure on the Properties of Polyurethanes. Journal of Applied Polymer Science, 69:1621-1633, 1998.
Gunatillake, P.A. et al., "Poly(dimethylsiloxane)/Poly(hexamethylene oxide) Mixed Macrodiol Based Polyurethane Elastomers. I. Synthesis and Properties", Journal of Appl. Polym. Sci. 2000, 76, 2026-2040, © 2000.
Gyor, M., et. al. Living Carbocationic Polymerization of Isobutylene with Blocked Bifunctional Initiators in the Presence of Di-tert-butylpyridine as a Proton Trap. J. of Macromolecular Science, Part A, Pure Appl. Chem., 29 (8):639-653, 1992.
H. Mach and P. Rath. "Highly Reactive Polyisobutene as a Component of a New Generation of Lubricant and Fuel Additives," Lubrication Science 11-2, Feb. 1999, pp. 175-185.
Hansen, Charles M. Hansen Solubility Parameters: A User's Handbook, 2nd ed. New York, CRC Press, Taylor & Francis Group, 2007, 546 pages.

Hernandez, et. al. R. Microstructural Organization of Three-Phase Polydimethylsiloxane-Based Segmented Polyurethanes. Macromolecules, 40:5441-5449, 2007.
Hernandez, R., et. al. A Comparison of Phase Organization of Model Segmented Polyurethanes with Different Intersegment Compatibilities. Macromolecules, 41:9767-9776, 2008.
Higashihara, T. et al., "Synthesis of Poly(isobutylene-block-methyl methacrylate) by a Novel Coupling Approach", Macromolecules, 39:5275-5279 (2006).
International Preliminary Report on Patentability and Written Opinion dated May 26, 2015 for International Application No. PCT/US2013/071170, entitled "High Strength Polyisobutylene Polyurethanes".
International Preliminary Report on Patentability issued in PCT/US2016/027294, dated Nov. 2, 2017, 7 pages.
International Preliminary Report on Patentability issued in PCT/US2016/067363, dated Jun. 28, 2018, 7 pages.
International Preliminary Report on Patentability, Chapter II, issued in PCT/US2006/035064, dated Sep. 12, 2007, 12 pages.
International Search Report and Written Opinion issued in PCT/US2006/013308, dated Aug. 25, 2006.
International Search Report and Written Opinion issued in PCT/US2006/035064, dated Jan. 23, 2007, 12 pages.
International Search Report and Written Opinion issued in PCT/US2007/007558, dated Sep. 20, 2007.
International Search Report and Written Opinion issued in PCT/US2007/008528, dated Oct. 2, 2007.
International Search Report and Written Opinion issued in PCT/US2007/012948, dated Nov. 28, 2007.
International Search Report and Written Opinion issued in PCT/US2010/028334, dated May 6, 2010, 12 pages.
International Search Report and Written Opinion issued in PCT/US2010/046072, dated Oct. 15, 2010, 10 pages.
International Search Report and Written Opinion issued in PCT/US2010/047633, dated Jun. 17, 2011, 12 pages.
International Search Report and Written Opinion issued in PCT/US2010/047703, dated Jun. 17, 2011, 12 pages.
International Search Report and Written Opinion issued in PCT/US2011/061692, dated Feb. 9, 2012, 9 pages.
International Search Report and Written Opinion issued in PCT/US2013/053448, dated Apr. 28, 2014, 11 pgs.
International Search Report and Written Opinion issued in PCT/US2013/053448, dated Jul. 28, 2014, correcting earlier version dated Apr. 28, 2014, 11 pages.
International Search Report and Written Opinion issued in PCT/US2016/027294 dated Jul. 28, 2016, 10 pages.
International Search Report and Written Opinion issued in PCT/US2016/067363, dated Mar. 3, 2017, 10 pages.
International Search Report and Written Opinion issued in PCT/US2017/031856, dated Aug. 11, 2017, 9 pages.
International Search Report issued in PCT/US2009/048827, dated Oct. 6, 2009, 3 pages.
International Search Report issued in PCT/US2009/048845, dated Oct. 6, 2009, 3 pages.
International Search Report issued in PCT/US2010/020733, dated May 6, 2010.
Ioffe, David et al., "Bromine, Organic Compounds", Kirk-Othmer Encyclopedia of Chemical Technology, vol. 4, pp. 340-365, © 2002.
Ivan, B. et al., "Synthesis of New Polyisobutylene-Based Polyurethanes", Am. Chem. Soc., Div. Org. Coat. Plast. Prepr., 43, 908-913 (1980).
Ivan, B., et. al. Living Carbocationic Polymerization. XXX. One-Pot Synthesis of Allyl-Terminated Linear and Tri-Arm Star Polyisobutylenes, and Epoxy- and Polyisobutylenes, and Epoxy- and Hydroxy-Telechelics Therefrom. Journal of Polymer Science: Part A: Polymer Chemistry, 28:89-104, 1990.
Ivan, Bela, et. al. New Telechelic Polymers and Sequential Copolymers by Polyfunctional Initiator-Transfer Agents (Inifers). VII. Synthesis and Characterization of alpha,omega-Di(hydroxy) Polyisobutylene. Journal of Polymer Science: Polymer Chemistry Edition, 18:3177-3191, 1980.
Ivan, Bela; et al. "Living Carbocationic Polymerization. XXX. One-Pot Synthesis of Allyl-Terminated Linear and Tri-Arm Star

(56) References Cited

OTHER PUBLICATIONS

Polyisobutylenes, and Epoxy- and Hydroxy-Telechelics Therefrom." Journal of Polymer Science: Part A: Polymer Chemistry, vol. 28, 89-104 (1990).
Jenny, C. et al., "A New Insulation Material for Cardiac Leads with Potential for Improved performance", HRS 2005, HeartRhythm, 2, S318-S319 (2005).
Jewrajka, Suresh K. et al., "Polyisobutylene-Based Polyurethanes. II. Polyureas Containing Mixed PIB/PTMO Soft Segments", Journal of Polymer Science: Part A: Polymer Chemistry, vol. 47, 2787-2797 (2009).
Jewrajka, Suresh K. et al., "Polyisobutylene-Based Segmented Polyureas. I. Synthesis of Hydrolytically and Oxidatively Stable Polyureas", Journal of Polymer Science: Part A: Polymer Chemistry, vol. 47, 38-48 (2009).
Kabalka, George W.; et al. "N-t-Butoxycarbonyl Protection of Primary and Secondary Amines in the Hydroboration Reaction: Synthesis of Amino Alcohols." Synthetic Communications: An International Journal for Rapid Communication of Synthetic Organic Chemistry, 25(14), 2135-2143 (1995).
Kali, Gergely; et al. "Anionic Amphiphilic End-Linked Conetworks by the Combination of Quasiliving Carbocationic and Group Transfer Polymerizations." Journal of Polymer Science, Part A—Polymer Chemistry, 2009, 47(17):4289-4301.
Kang, Jungmee et al, "PIB-Based Polyurethanes. IV. The Morphology of Polyurethanes Containing Soft Co-Segments", Journal of Polymer Science Part A: Polymer Chemistry, vol. 47, 6180-6190 (2009).
Kang, Jungmee et al., "Rendering Polyureas Melt Processible", Journal of Polymer Science Part A: Polymer Chemistry, vol. 49, 2461-2467 (2011).
Kang, Jungmee et al., Polyisobutylene-Based Polyurethanes. V. Oxidative-Hydrolytic Stability and Biocampatibility, Journal of Polymer Science: Part A: Polymer Chemistry, vol. 48, 2194-2203 (2010).
Kang, Jungmee, et al. Polyisobutylene-Based Polyurethanes with Unprecedented Properties and How They Came About. Polymer Chemistry, 49:3891-3904.
Kennedy, J.P. et al., "Designed Polymers by Carbocationic Macromolecular Engineering: Theory and practice", Hanser Publishers 1991, pp. 191-193 and 226-233.
Kennedy, J.P. et al., "Polyisobutylene-Based Diols and Polyurethanes", Urethane Chemistry and Applications, Ed., K. H. Edwards, ACS Symp. Book Series, 172, Washington, D.C. 1981, pp. 383-391.
Kennedy, J.P. et al., "Polyisobutylene-Based Diols and Polyurethanes" Advances in Urethane Science and Technology, vol. 8, 1981, pp. 245-251.
Kennedy, J.P. et al., "Polyisobutylene-based Model urethane Networks, I. Initial characterization and Physical properties", Polymeric Materials Science and Engineering, vol. 49, Copyright 1983 by ACS, pp. 69-77.
Kennedy, Joseph P. Synthesis, Characterization and Properties of Novel Polyisobutylene-Based urethane Model Networks, Journal of Applied Polymer Science, vol. 33(7), May 20, 1987, pp. 2449-2465.
Kennedy, Joseph P. "Synthesis, Characterization and Properties of Polyisobutylene-Based Polyurethanes", 6th International Technical/Marketing Conference: Polyurethane—New Paths to Progress-Marketing—Technology, Journal of Cellular Plastics, 1983, 19:288-307.
Kennedy, Joseph P. "Synthesis, Characterization and Properties of Polyisobutylene-Based Polyurethanes", Journal of Elastomers and Plastics, vol. 17 (Jan. 1985), pp. 82-88.
Kennedy, Joseph P. "Synthesis, Characterization and Properties of Polyisobutylene-Based Polyurethanes", The Society of the Plastics Industry, Inc., polyurethane Division, Proceedings of the SPI—6th International Technical/Marketing Conference, Nov. 2-4, 1983, San Diego, CA, pp. 514-516.
Kennedy, Joseph P., "Polyurethanes Based on Polyisobutylenes", Chemtech, Nov. 1986, 16(11), pp. 694-697.
Kirby, Darren, "Use of a Bioactive Material on a Pacemaker Electrode for the Purpose of Enhancing Heart Pace/Sense Efficiency", MSC Biomedical Engineering, Thesis, Trinity College Dublin (2003).
Koberstein, J. T., et. al. Compression-Molded Polyurethane Block Copolymers. 1. Microdomain Morphology and Thermomechanical Properties. Macromolecules, 25:6195-6204, 1992.
Koberstein, J. T., et. al. Compression-Molded Polyurethane Block Copolymers. 2. Evaluation of Microphase Compositions. Macromolecules, 25:6205-6213, 1992.
Koberstein, J. T., et. al. Simultaneous SAXS-DSC Study of Multiple Endothermic Behavior in Polyether-Based Polyurethane Block Copolymers. Macromolecules, 19:714-720, 1986.
Kunal, K., et. al. Polyisobutylene: A Most Unusual Polymer. Journal of Polymer Science: Part B: Polymer Physics, 46:1390-1399, 2008.
Lazzarato, Loretta; et al. "(Nitrooxyacyloxy)methyl Esters of Aspirin as Novel Nitric Oxide Releasing Aspirins." J. Med. Chem. 2009, 52, 5058-5068.
Lelah, M.D. et al., "Polyurethanes in Medicine", CRC Press, Boca Raton, FL 1986, Chapter 3.
Leung, L. M., et. al. DSC Annealing Study of Microphase Separation and Multiple Endothermic Behavior in Polyether-Based Polyurethane Block Copolymers. Macromolecules, 19:706-713, 1986.
Li, J. et al., "Polyisobutylene supports—a non-polar hydrocarbon analog of PEG supports", Tetrahedron, 61 (51):12081-12092, Dec. 2005.
Macias, A. et al., "Preparacion y reticulacion de poliisobutilenos de bajo peso molecular con grupos terminales reactivos", Revista de Plasticos Modernos, Num 332 (Apr. '83), pp. 412-418.
Martin, D. J., et. al. Polydimethylsiloxane/Polyether-Mixed Macrodiol-Based Polyurethane Elastomers: Biostability. Biomaterials, 21:1021-1029, 2000.
Miller, J. A., "New Directions in Polyurethane Research", Organic Coatings and Applied Polymer Science Proceedings, vol. 47, Copyright 1982 by ACS, pp. 124-129.
Mitzner, E. et al., "Modification of poly(ether urethane) elastomers by incorporation of poly(isobutylene) glycol. Relation between polymer properties and thrombogenicity", J. Biomater. Sci. Polymer edn. vol. 7, No. 12, pp. 1105-1118 (1996).
Mitzner, E., "Modification of segmented poly(ether urethanes) by incorporation of Poly(isobutylene)glycol", J.M.S.-Pure Appl. Chem., A34(1), pp. 165-178 (1997).
Mitzner, E., et. al. Modification of Segmented Poly(Ether Urethanes) by Incorporation of Poly(Isobutylene)Glycol. Journal of Macromolecular Science, Part A., Pure and Applied Chemistry, 34(1):165-178, 1997.
Miyabayashi, Toshio et al., "Characterization of Polyisobutylene-Based Model Urethane Networks", Journal of Applied Polymer Science, vol. 31, pp. 2523-2532 (1986).
Muller, J.P. et al., "Surface modification of polyurethanes by multicomponent polyaddition reaction", Journal of Materials Science Letters 17(2), 1998, pp. 115-118.
Non-Final Office Action issued in U.S. Appl. No. 11/400,059, dated Apr. 11, 2011.
Non-Final Office Action issued in U.S. Appl. No. 12/492,483, dated Nov. 21, 2011, 11 pages.
International Search Report and Written Opinion issued in PCT/US2018/021311, dated May 24, 2018, 11 pages.
Non-Final Office Action, issued in U.S. Appl. No. 12/685,858, dated Feb. 15, 2012, 18 pages.
Notice of Allowance issued in U.S. Appl. No. 12/492,483, dated Jul. 13, 2012, 9 pages.
Notification of Transmittal of the International Search Report and the Written Opinion of the International Searching Authority for Int'l Application No. PCT/US2013/071170, entitled: High Strength Polyisobutylene Polyurethanes, dated Jun. 6, 2014.
Odian, G. "Principles of Polymerization," Wiley Interscience (2004), pp. 80-83.
Office Action issued in EP 07754128 dated Mar. 31, 2010.
Office Action issued in EP Application No. 07754128.2, dated Feb. 19, 2009, 3 pages.
Office Action issued in U.S. Appl. No. 11/400,059, dated Aug. 24, 2010.

(56) References Cited

OTHER PUBLICATIONS

Ojha et al., "Synthesis and Characterization of Thermoplastic Polyurethaneureas based on Polyisobutylene and Poly (tetramethylene oxide) Segments", J. Macromolecular Science, Part A, vol. 47(3), pp. 186-191, Mar. 2010.

Ojha, Umaprasana et al., "Syntheses and characterization of novel biostable polyisobutylene based thermoplastic polyurethanes", Polymer 50(2009), 3448-3457.

Ojha, Umaprasana et al., "Synthesis and Characterization of Endfunctionalized Polyisobutylenes for Sharpless-type Click Reactions", Polymer Preprints 2007, 48(2), 786.

Ojha, Umaprasana, et al. Syntheses and Characterization of Novel Biostable Polyisobutylene Based Thermoplastic Polyurethanes. Polymer 50:3448-3457, 2009.

Pinchuk, L. Review: A Review of the Biostability and Carcinogenicity of Polyurethanes in Medicine and the New Generation of 'Biostable' Polyurethanes. J. Biomater. Sci., Polymer Edn., 6(3):225-267, 1994.

Puskas, J.E. et al., "polyisobutylene-based biomaterials", Journal of Polymer Science Part A: Polymer Chemistry, vol. 42, Issue 13 (2004) pp. 3091-3109.

Rajkhowa, Ritimoni et al., "Efficient syntheses of hydroxyallyl end functional polyisobutylenes, a precursors to thermoplastic polyurethanes", Polymer Reprints (American Chemical Society, Division of Polymer Chemistry) 2007, 48 (2), 233-234.

Ranade, S. et al., "Physical characterization of controlled release of paclitaxel from the TAXUS™ Express2™ drug-eluting stent", Journal of Biomedical Materials Research Part A, 71A (2004) 625-634.

Ranade, S.V. et al., Styrenic Block copolymers for Biomaterial and Drug Delivery Applications, Acta Biomater. Jan. 2005; 1(1): 137-44.

Response filed Aug. 31, 2009 to Office Action dated Feb. 19, 2009, EP App 07754128.

Saiani, A., et. al. Origin of Multiple Melting Endotherms in a High Hard Block Content Polyurethane. 1. Thermodynamic Investigation. Macromolecules, 34:9059-9068, 2001.

Saiani, A., et. al. Origin of Multiple Melting Endotherms in a High Hard Block ContentPolyurethane. 2. Structural Investigation. Macromolecules, 37:1411-1421, 2004.

Santos, R. et al., "New Telechelic Polymers and Sequential Copolymers by Polyfunctional Initiator-Transfer-Agents (Inifers)", Polymer Bulletin, 11:341-348 (1984).

Schellekens, Yves, et al. "Tin-Free Catalysts for Production of Aliphatic Thermoplastic Polyurethanes." Green Chemistry, 16:4401-4407, 2014.

Second Office Action for Chinese Application No. 201380042582.3, entitled "High Strength Polyisobutylene Polyurethanes" dated May 10, 2016 consisting of 5 pages.

Siefken, Von Werner. "Mono-und Polyisocyanate, IV. Mitteilung uber Polyurethane," [With machine English translation]. Justus Liebigs Annalen Der Chemie, 562(2):75-136, 1949.

Simmons, Anne. et al., "The effect of sterilisation on a poly(dimethylsiloxane)/poly(hexamethylene oxide) mixed macrodiol-based Polyurethane elastomer", Biomaterials 2006, 27, 4484-4497.

Singh, Vishwakarma; et al. "Molecular complexity from aromatics. Cycloaddition of spiroepoxycyclohexa-2,4-dienones and intramolecular Diels-Alder reaction: a stereoselective entry into tetracyclic core of atisane diterpenoids." Tetrahedron 69 (2013) 137-146.

Six, Christian, et al. "Isocyanates, Organic." Ullmann's Encyclopedia of Industrial Chemistry, vol. 20:63-82, 2012.

Speckhard, T. A., et. al. Properties of Polyisobutylene Polyurethane Block Copolymers: 2. Macroglycols Produced by the "Inifer" Technique. Polymer, 26:55-69, 1985.

Speckhard, T.A. et al., "New generation polyurethanes", Polymer News 1984, 9(12), 354-358.

Speckhard, T.A. et al., "Properties of Polyisobutylene Polyurethane Block Copolymers: 2. Macroglycols produced by the 'inifer' technique", Polymer, vol. 26, No. 1, Jan. 1985, pp. 55-78.

Speckhard, T.A. et al., "Properties of Polyisobutylene Polyurethane Block Copolymers: 3. hard segments based on 4,4'-dicyclohexylmethane diisocyanate (H12MDI) and butane diol", Polymer, vol. 26, No. 1, Jan. 1985, pp. 70-78.

Speckhard, T.A. et al., "Properties of Polyisobutylene-Polyurethane Block Copolymers", Journal of Elastomers and Plastics, vol. 15 (Jul. 1983), pp. 183-192.

Speckhard, T.A. et al., "Properties of Polyisobutylene-Polyurethane Block Copolymers: I. Macroglycols from Ozonolysis of Isobutylene-Isoprene Copolymer", Polymer Engineering and Science, Apr. 1983, vol. 23. No. 6, pp. 337-349.

Speckhard, T.A. et al., "Ultimate Tensite Properties of Segmented Polyurethane Elastomers", Rubber Chem. Technol., 59, 405-431 (1986).

Stokes, K., et. al. Polyurethane Elastomer Biostability. Journal of Biomaterials Applications, 9:321-354, 1995.

Storey, Robson F.; et al. "Carbocation Rearrangement in Controlled/Living Isobutylene Polymerization," Macromolecules 1998, 31, pp. 1058-1063.

Tan, J. et al., "In Vivo Biostability Study of a New Lead Insulation Material," Cardiostim 2006, Europace Supplements, 8, 179PW/9 (2006).

Third Office Action for Chinese Application No. 201380042582.3, entitled "High Strength Polyisobutylene Polyurethanes" dated Jul. 27, 2016 consisting of 5 pages.

Tonelli, C. et al., "New Fluoro-Modified Thermoplastic Polyurethanes" Journal of Applied Polymer Science, vol. 87, Issue 14 (2003) 2279-2294.

Tonelli, Claudio et al., "New Perfluoropolyether Soft Segment Containing Polyurethanes", Journal of Applied Polymer Science, vol. 57, pp. 1031-1042 (1995).

Virmani, R. et al. Circulation Feb. 17, 2004, 109)6) 701-5.

Viski, Peter, et al. "A Novel Procedure for the Cleavage of Olefin Derivatives to Aldehydes Using Potassium Permanganate." J. Org. Chem., 51:3213-3214, 1986.

Wang, F. Polydimethylsiloxane Modification of Segmented Thermoplastic Polyurethanes and Polyureas, PhD. Dissertation, Virginia Polytechnic Institute and State university, Apr. 13, 1998.

Weisberg, David M. et al., "Synthesis and Characterization of Amphiphilic Poly(urethaneurea)-comb-polyisobutylene Copolymers", Macromolecules 2000, 33(12), pp. 4380-4389.

Weiss, H. G.; et al. "Diborane from the Sodium Borohydride-Sulfuric Acid Reaction." Contribution From Research Laboratory, Olin Mathieson Chemical Corporation, Dec. 5, 1959, 81(23):6167-6168.

Weissmuller, M. et al., "Preparation and end-linking of hydroxyl-terminated polystyrene star macromolecules", Macromolecular Chemistry and Physics 200(3), 1999, 541-551.

Wiggins, Michael J. et al., "Effect of soft-segment chemistry on polyurethane biostability during in vitro fatigue loading", Journal of biomedical materials research, 68(4), 2004, 668-683.

Wohlfarth, C., "Permittivity (Dielectric Constant) of Liquids", CRC Handbook, 91st ed. 2010-2011, p. 6-186 to 6-207.

Wright, James I., "Using Polyurethanes in Medical Applications", 5 pages. Downloaded from http://www.cmdm.com on Oct. 17, 2006.

Wu, Yuguang et al., "The role of adsorbed fibrinogen in platelet adhesion to polyurethane surfaces: A comparison of surface hydrophobicity, protein adsorption, monoclonal antibody binding, and platelet adhesion", Journal of Biomedical Materials Research, Part A, Sep. 15, 2005, vol. 74A, No. 4, pp. 722-738.

Xu, Ruijian et al., "Low permeability biomedical polyurethane nanocomposites", Journal of Miomedical Materials Resarch, 2003, vol. 64A, pp. 114-119.

Yang, M. et al., J. biomed. Mater. Res. 48 (1999) 13-23.

Yeh, J. et al., "Moisture diffusivity of Biomer® versus Biomer®-coated Polyisobutylene polyurethane urea (PIB-PUU): a potential blood sac material for the artificial heart", Journal of Materials Science Letters 13(19), 1994, pp. 1390-1391.

Yoon, Sung C. et al., "Surface and bulk structure of segmented poly(ether urethanes) with Perfluoro Chain Extenders. 5. Incorporation of Poly(dimethylsiloxane) and Polyisobutylene Macroglycols", Macromolecules Mar. 14, 1994, 27(6), pp. 1548-1554.

(56) References Cited

OTHER PUBLICATIONS

York, P., "New Materials and Systems for Drug Delivery and Targeting", Chemical Aspects of Drug Delivery Systems, Copyright 1996, pp. 1-10, proceedings from a symposium held Apr. 17-18, 1996 at Salford University.

Zhang, F., et. al. Glassy Carbon as an Absolute Intensity Calibration Standard for Small-Angle Scattering. Metallurgical and Materials Transactions A, 41A:1151-1158, May 2010.

* cited by examiner

HYDROBORATION/OXIDATION OF ALLYL-TERMINATED POLYISOBUTYLENE

CROSS-REFERENCE TO RELATED APPLICATION

This application claims priority to Provisional Application No. 62/468,316, filed Mar. 7, 2017, which is herein incorporated by reference in its entirety.

TECHNICAL FIELD

The present invention relates to methods for making polyisobutylene diol. More specifically, the invention relates to methods for making a polyisobutylene diol from a polyisobutylene diallyl.

BACKGROUND

Thermoplastic elastomers based on difunctional, telechelic soft segments have exceptionally desirable properties. Examples of difunctional telechelic soft segments useful in such thermoplastic elastomers include polyisobutylene-based soft segments. There are many unique and desirable physical and mechanical properties that are offered exclusively by polyisobutylene and polyisobutylene-based materials, including thermal stability, biocompatibility and gas impermeability, among others. These properties can be tuned and further modified in copolymerization strategies with other materials, for example, to synthesize polyurethanes based on a polyisobutylene (PIB) soft segment. A process of making polyisobutylene-based soft segments by carbocationic polymerization begins with a difunctional initiator molecule and produces a polyisobutylene diol.

Some of the materials used in the process of making polyisobutylene diol are costly, hazardous, and difficult to handle. Safer and less costly materials are needed.

SUMMARY

Example 1 is a method for making a polyisobutylene diol from a polyisobutylene diallyl. The method includes hydroborating the polyisobutylene diallyl to produce a polyisobutylene dialkyl borane, and oxidizing the polyisobutylene dialkyl borane to form the polyisobutylene diol. The polyisobutylene diallyl is hydroborated by combining in situ the polyisobutylene diallyl with a borane-coordinating solvent, an alkaline metal salt of borohydride, and an acid. The alkaline metal salt of borohydride is combined with the polyisobutylene diallyl before the acid is combined with the polyisobutylene diallyl.

Example 2 is the method of Example 1, wherein the alkaline metal salt of borohydride includes at least one of sodium borohydride, potassium borohydride, and lithium borohydride.

Example 3 is the method of either of Examples 1 or 2, wherein the acid is the strong mineral acid, the strong mineral acid including at least one of sulfuric acid, hydrochloric acid, hydroiodic acid, and hydrobromic acid.

Example 4 is the method of either of Examples 1 or 2, wherein the acid includes a strong Lewis acid, a halide, or a combinations thereof; the strong Lewis acid including at least one of boron trichloride, aluminum trichloride, and aluminum trifluoride; and the halide including at least one of iodine and bromine.

Example 5 is the method of any of Examples 1-4, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

Example 6 is the method of any of Examples 1-5, wherein oxidizing the polyisobutylene dialkyl borane to form the polyisobutylene diol includes combining a base and an oxidizer with the polyisobutylene dialkyl borane.

Example 7 is the method of Example 6, wherein the oxidizer is at least one of hydrogen peroxide, peracetic acid, potassium permanganate, and benzoyl peroxide.

Example 8 is the method of either of Examples 6 or 7, wherein the base includes at least one of sodium hydroxide and potassium hydroxide.

Example 9 is a method for making a polyisobutylene diol, the method including providing a polyisobutylene dichloride, reacting the polyisobutylene dichloride with allyltrimethylsilane to produce a polyisobutylene diallyl, hydroborating the polyisobutylene diallyl to produce a polyisobutylene dialkyl borane, and combining a base and an oxidizer with the polyisobutylene dialkyl borane to form the polyisobutylene diol. The polyisobutylene diallyl is hydroborated by combining in situ the polyisobutylene diallyl with a borane-coordinating solvent, an alkaline metal salt of borohydride, and an acid. The alkaline metal salt of borohydride is combined with the polyisobutylene diallyl before the acid is combined with the polyisobutylene diallyl.

Example 10 is the method of Example 9, wherein the alkaline metal salt of borohydride includes at least one of sodium borohydride, potassium borohydride, and lithium borohydride.

Example 11 is the method of either of Examples 9 or 10, wherein the acid is the strong mineral acid, the strong mineral acid including at least one of sulfuric acid, hydrochloric acid, hydroiodic acid, and hydrobromic acid.

Example 12 is the method of either of Examples 9 or 10, wherein the acid includes a strong Lewis acid, a halide, or a combinations thereof; the strong Lewis acid including at least one of boron trichloride, aluminum trichloride, and aluminum trifluoride; and the halide including at least one of iodine and bromine.

Example 13 is the method of any of Examples 9-12, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

Example 14 is the method of any of Examples 9-13, wherein the oxidizer is at least one of hydrogen peroxide, peracetic acid, potassium permanganate, and benzoyl peroxide.

Example 15 is the method of any of Examples 9-14, wherein the base includes at least one of sodium hydroxide and potassium hydroxide.

Example 16 is a method for making a polyisobutylene diol, the method including providing a polyisobutylene diallyl, hydroborating the polyisobutylene diallyl to produce a polyisobutylene dialkyl borane, and oxidizing the polyisobutylene dialkyl borane to form the polyisobutylene diol. The polyisobutylene diallyl is hydroborated by combining in situ the polyisobutylene diallyl with a borane-coordinating solvent, an alkaline metal salt of borohydride, and an acid. The alkaline metal salt of borohydride is combined with the polyisobutylene diallyl before the acid is combined with the polyisobutylene diallyl.

Example 17 is the method of Example 16, wherein the alkaline metal salt of borohydride includes at least one of sodium borohydride, potassium borohydride, and lithium borohydride.

Example 18 is the method of either of Examples 16 or 17, wherein the acid is the strong mineral acid, the strong mineral acid including at least one of sulfuric acid, hydrochloric acid, hydroiodic acid, and hydrobromic acid.

Example 19 is the method of either of Examples 16 or 17, wherein the acid includes a strong Lewis acid, a halide, or a combinations thereof; the strong Lewis acid including at least one of boron trichloride, aluminum trichloride, and aluminum trifluoride; and the halide including at least one of iodine and bromine.

Example 20 is the method of any of Examples 16-19, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

Example 21 is the method of any of Examples 16-20, wherein providing the polyisobutylene diallyl includes providing a polyisobutylene dichloride, and reacting the polyisobutylene dichloride with allyltrimethylsilane to produce the polyisobutylene diallyl.

Example 22 is the method of Example 16, wherein oxidizing the polyisobutylene dialkyl borane to form the polyisobutylene diol includes combining a base and an oxidizer with the polyisobutylene dialkyl borane.

Example 23 is the method of Example 22, wherein the oxidizer is at least one of hydrogen peroxide, peracetic acid, potassium permanganate, and benzoyl peroxide.

Example 24 is the method of either of Examples 22 or 23, wherein the base includes at least one of sodium hydroxide and potassium hydroxide.

Example 25 is a method for making a polyisobutylene diol, the method including providing a polyisobutylene dichloride, reacting the polyisobutylene dichloride with allyltrimethylsilane to produce a polyisobutylene diallyl, hydroborating the polyisobutylene diallyl to produce a polyisobutylene dialkyl borane, and combining a base and an oxidizer with the polyisobutylene dialkyl borane to form the polyisobutylene diol. The polyisobutylene diallyl is hydroborated by combining in situ the polyisobutylene diallyl with a borane-coordinating solvent, an alkaline metal salt of borohydride, and an acid. The alkaline metal salt of borohydride is combined with the polyisobutylene diallyl before the acid is combined with the polyisobutylene diallyl.

Example 26 is the method of Example 25, wherein the alkaline metal salt of borohydride includes at least one of sodium borohydride, potassium borohydride, and lithium borohydride.

Example 27 is the method of either of Examples 25 or 26, wherein the acid is the strong mineral acid, the strong mineral acid including at least one of sulfuric acid, hydrochloric acid, hydroiodic acid, and hydrobromic acid.

Example 28 is the method of either of Examples 25 or 26, wherein the acid includes a strong Lewis acid, a halide, or a combinations thereof; the strong Lewis acid including at least one of boron trichloride, aluminum trichloride, and aluminum trifluoride; and the halide including at least one of iodine and bromine.

Example 29 it the method of any of Examples 25-28, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

Example 30 is the method of any of Examples 25-29, wherein the oxidizer is at least one of hydrogen peroxide, peracetic acid, potassium permanganate, and benzoyl peroxide.

Example 31 is the method of any of Examples 25-30, wherein the base includes at least one of sodium hydroxide and potassium hydroxide.

Example 32 is a method for making a polyisobutylene diol, the method including providing a polyisobutylene dichloride, reacting the polyisobutylene dichloride with allyltrimethylsilane to produce a polyisobutylene diallyl, hydroborating the polyisobutylene diallyl to produce a polyisobutylene dialkyl borane, and combining hydrogen peroxide and at least one of sodium hydroxide and potassium hydroxide with the polyisobutylene dialkyl borane to form the polyisobutylene diol. The polyisobutylene diallyl is hydroborated by combining in situ the polyisobutylene diallyl with tetrahydrofuran, an alkaline metal salt of borohydride, and an acid. The alkaline metal salt of borohydride is combined with the polyisobutylene diallyl before the acid is combined with the polyisobutylene diallyl.

Example 33 is the method of Example 32, wherein the acid is the strong mineral acid, the strong mineral acid including at least one of sulfuric acid, hydrochloric acid, hydroiodic acid, and hydrobromic acid.

Example 34 is the method of Example 32, wherein the acid includes a strong Lewis acid, a halide, or a combinations thereof; the strong Lewis acid including at least one of boron trichloride, aluminum trichloride, and aluminum trifluoride; and the halide including at least one of iodine and bromine.

Example 35 is the method of any of Examples 32-34, wherein the alkaline metal salt of borohydride includes at least one of sodium borohydride, potassium borohydride, and lithium borohydride.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
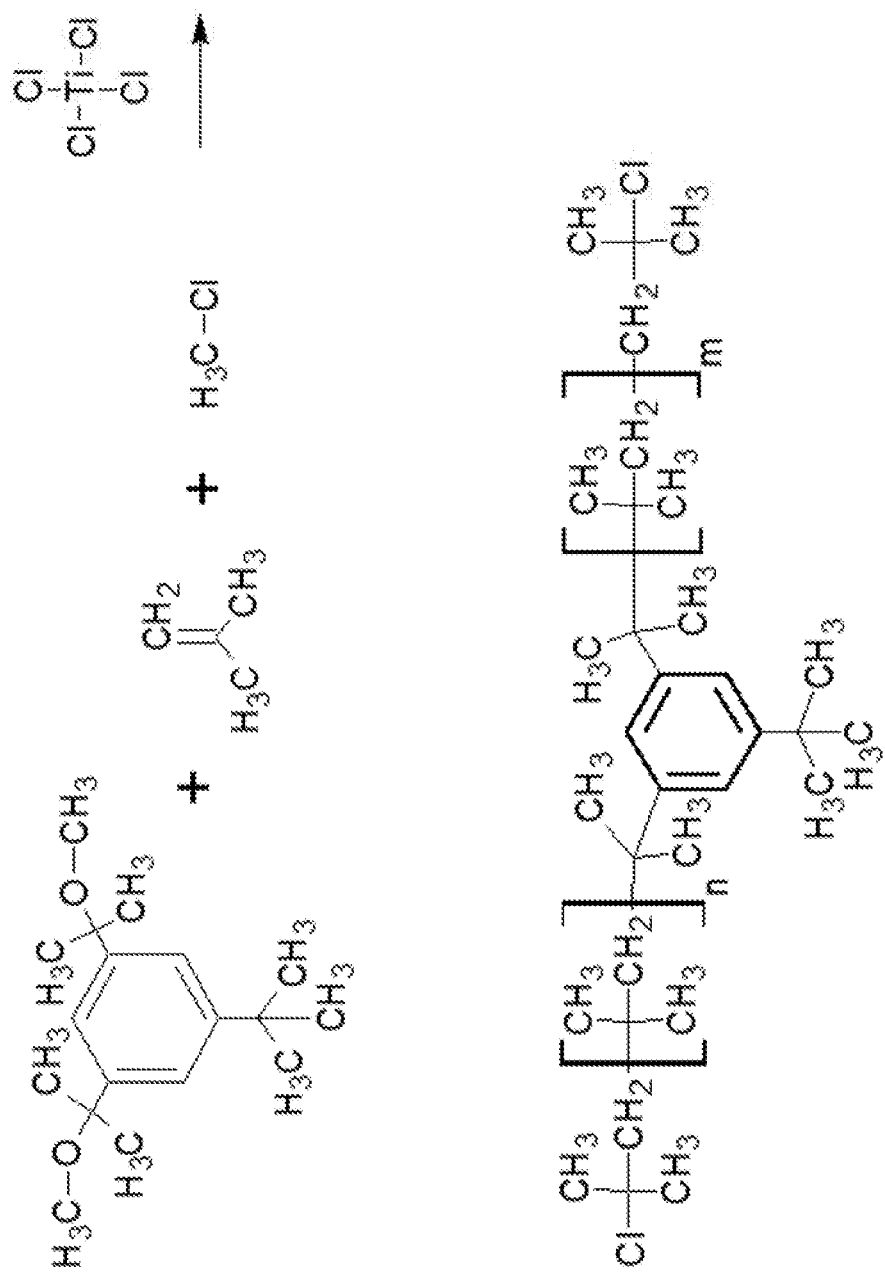
FIG. 1 illustrates the formation of polyisobutylene dichloride according to embodiments of this disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In embodiments of this disclosure, producing a polyisobutylene diol can require a hydroboration of a polyisobutylene diallyl followed by an oxidation step. A reagent generally employed in the art to provide borane for hydroboration is 9-borabicyclo(3.3.1)nonane (9-BBN). However, 9-BBN is a costly material that is difficult to handle and store. Additionally, 9-BBN is flammable.

Embodiments of this disclosure can employ an alkaline metal salt of borohydride combined with an acid in a borane-coordinating solvent to provide a source of borane for hydroboration. In embodiments of this disclosure, the alkaline metal salt of borohydride and the acid are combined with the polyisobutylene diallyl in situ and are added to the polyisobutylene diallyl separately from each other. That is, the alkaline metal salt of borohydride and the acid are not combined with each other before being added to the polyisobutylene diallyl. In this way, the borane is formed only in the reaction vessel containing the polyisobutylene diallyl, minimizing exposure of the borane to moisture before it can react with the polyisobutylene diallyl. This is beneficial because borane reacts readily with moisture to form boric acid, which must eventually be removed from the polyisobutylene diol, at additional cost. In addition, any borane reacting with moisture is not available for hydroboration, thus requiring additional material to generate borane and react with the polyisobutylene diallyl, which increases the cost of the hydroboration.

In contrast to 9-BBN, some alkaline metal salts of borohydride, such as sodium borohydride, are not flammable and are more easily stored. The use of sodium borohydride for hydroboration can result in about a 95% cost savings over the use of 9-BBN.

FIGS. 1-4 illustrate the production of polyisobutylene diol in accordance with embodiments of this disclosure. As shown in FIG. 1, isobutylene can react with a difunctional cationic initiator compound, such as hindered dicumyl ether, and methyl chloride in the presence of titanium tetrachloride to polymerize the isobutylene and produce the polyisobutylene dichloride. It is understood that this is but one way to produce polyisobutylene dichloride and that other methods may be employed.

Figure 2:
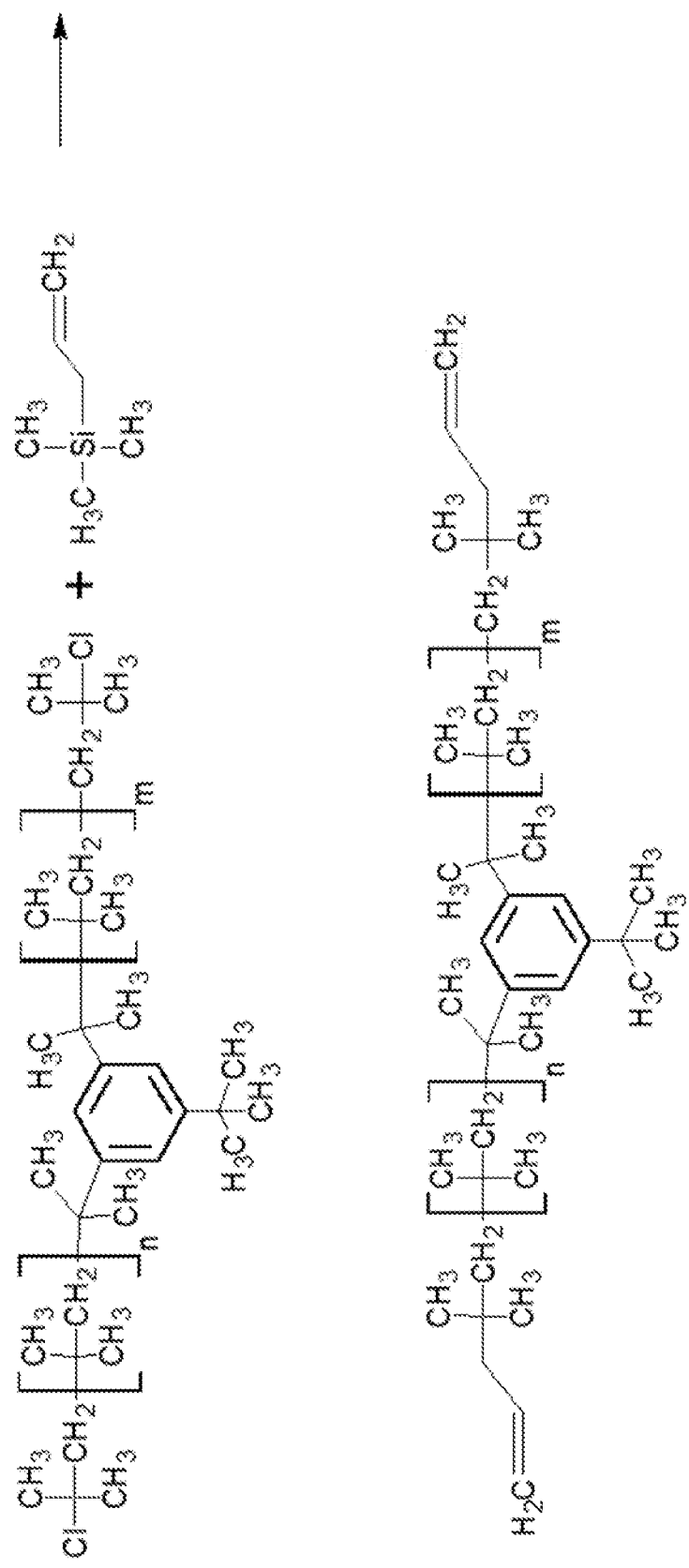
FIG. 2 illustrates the formation of polyisobutylene diallyl from the polyisobutylene dichloride of FIG. 1, according to embodiments of this disclosure.

Once the polyisobutylene dichloride is produced, allyl end groups can be added to the polyisobutylene chain. In the embodiment shown in FIG. 2, allyltrimethylsilane is added to the polyisobutylene dichloride. The polyisobutylene dichloride can then react with allyltrimethylsilane to produce the polyisobutylene diallyl, as shown in FIG. 2. The allyl end groups of the polyisobutylene diallyl result in near quantitative substitution, leading to the production of highly telechelic polymers. The highly telechelic polymers allow for higher molecular weight polymer chains having beneficial properties.

Once the polyisobutylene diallyl is produced, an alkaline metal salt of borohydride, and a borane-coordinating solvent are added in situ to the polyisobutylene diallyl. In some embodiments, the alkaline metal salt of the borohydride is added after the borane-coordinating solvent is added. In other embodiments, the borane-coordinating solvent is added after the alkaline metal salt of the borohydride is added. Following the addition of the alkaline metal salt of borohydride and the borane-coordinating solvent, an acid is added in situ to the polyisobutylene diallyl. As noted above, the alkaline metal salt of borohydride and the acid are not combined before being added to the polyisobutylene diallyl.

In some embodiments, the alkaline metal salt of the borohydride can include sodium borohydride, potassium borohydride, and or lithium borohydride. In some embodiments, the acid can include a strong mineral acid, such as sulfuric acid, hydrochloric acid, hydroiodic acid, hydrobromic acid, or mixtures thereof. In some embodiments, the acid can include an elemental halide, such as iodine, bromine, or mixtures thereof. In some embodiments, the acid can include a strong Lewis acid, such as boron trichloride, aluminum trichloride, aluminum trifluoride, or mixtures thereof. In some embodiments, the borane-coordinating solvent can include tetrahydrofuran (THF), diethyl ether, dimethoxyethane, diethylene glycol dimethyl ether, triethylene glycol dimethyl ether, tetraethylene glycol dimethyl ether, or mixtures thereof.

In some embodiments, the molar ratio of the borane-coordinating solvent to the alkaline metal salt of borohydride is at least 1:1 to coordinate and stabilize the borane to prevent side reactions. In some embodiments, the molar ratio of the borane-coordinating solvent to the alkaline metal salt of borohydride is as low as 1.1:1, 1.2:1, 1.3:1, 1.4:1, or 1.5:1, or as high as 1.6:1, 1.7:1, 1.8:1, 1.9:1, or 2.:1, or between any valued defined between any two of the foregoing values, such as 1.1:1 to 2:1, 1.2:1 to 1.9:1, 1.3:1 to 1.8:1, 1.4:1 to 1.7:1, or 1.5:1 to 1.6:1.

Combining the alkaline metal salt of the borohydride and the acid in the presence of the borane-coordinating solvent can create a borane complex. For example, in some embodiments, sodium borohydride ($NaBH_4$) and a mineral acid, such as sulfuric acid ($H_2SO_4$), are combined in situ with THF to produce a borane complex as shown in Equation 1 below:

$$2NaBH_4 + H_2SO_4 + 2THF \rightarrow 2BH_3{:}THF + Na_2SO_4 + H_2. \quad \text{Eq. 1}$$

The hydrogen gas ($H_2$) produced can be diluted with an inert gas, such as nitrogen, and safely vented away. The sodium sulfate ($Na_2SO_4$) can be removed by subsequent water washing.

In some other embodiments, sodium borohydride and a Lewis acid, such as boron trichloride ($BCl_3$), are combined in situ with THF to produce a borane complex as shown in Equation 2 below:

$$3NaBH_4 + BCl_3 + 4THF \rightarrow 4BH_3{:}THF + 3NaCl. \quad \text{Eq. 2}$$

Figure 3:
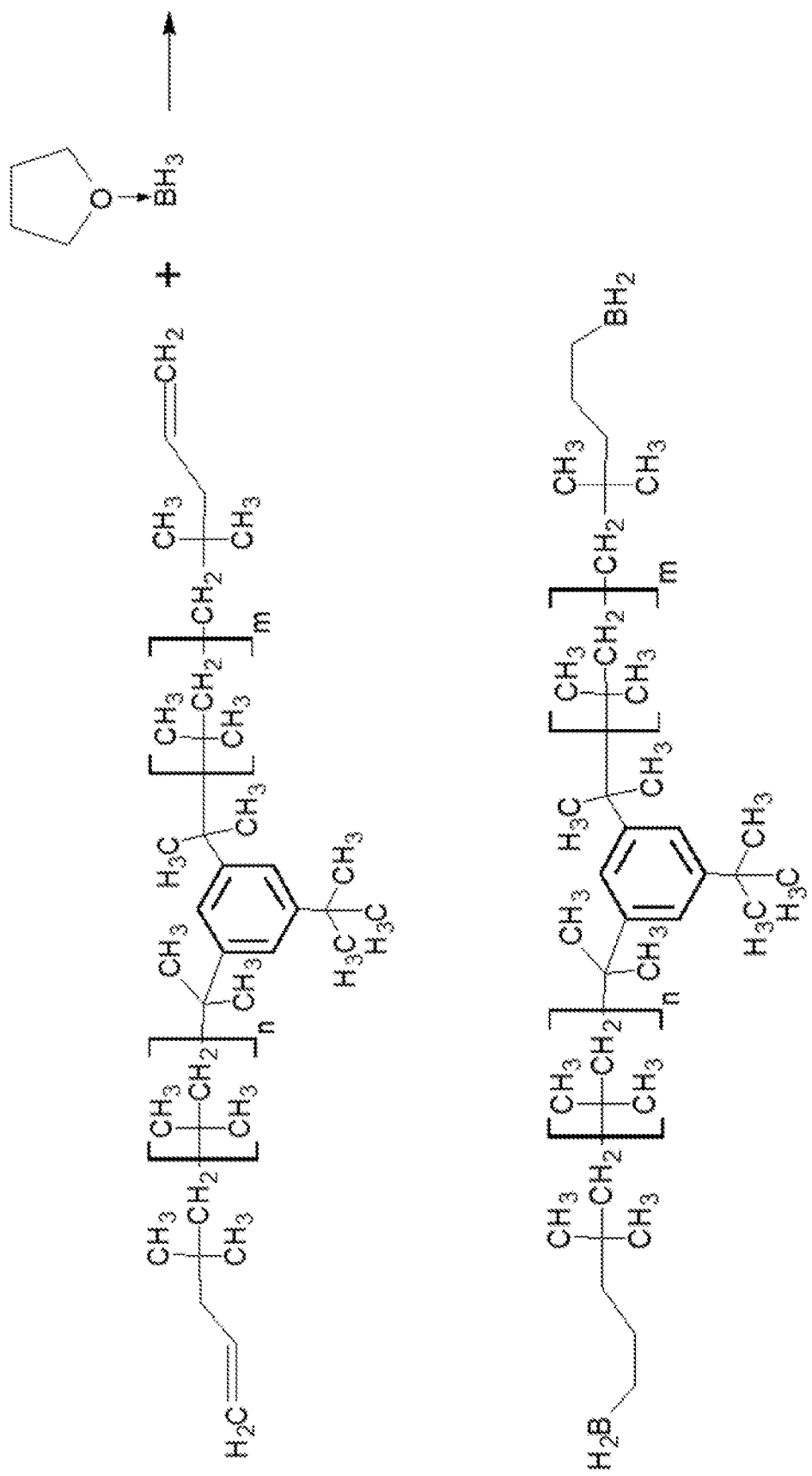
FIG. 3 illustrates the formation of polyisobutylene dialkyl borane from the polyisobutylene diallyl of FIG. 2, according to embodiments of this disclosure.

As shown in FIG. 3, the borane complex can react in situ with the polyisobutylene diallyl to produce a polyisobutylene dialkyl borane. It has been found that the borane complex is sufficiently reactive enough to hydroborate the allyl end groups of the polyisobutylene diallyl. This is surprising because the allyl end group, $R-CH_2-CH=CH_2$, is less reactive than other vinylidene end groups, such as $R-C(CH_3)=CH_2$, or $R-CH=CH_2$, where R is the polyisobutylene chain.

Figure 4:
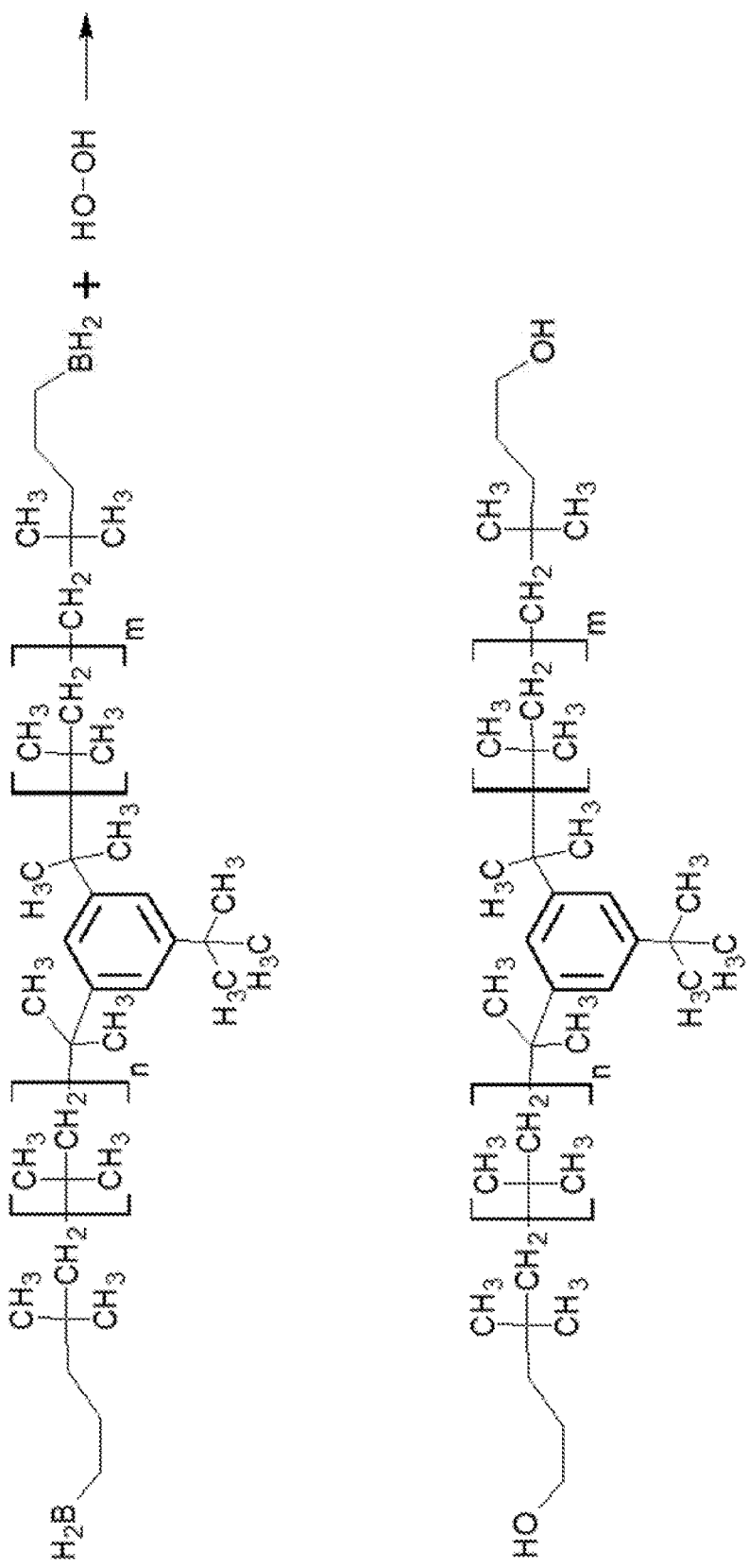
FIG. 4 illustrates the formation of polyisobutylene diol from the polyisobutylene dialkyl borane of FIG. 3, according to embodiments of this disclosure.

The polyisobutylene dialkyl borane can then be oxidized to form the polyisobutylene diol. In some embodiments, the polyisobutylene dialkyl borane can be oxidized by the addition of an oxidizer, for example, hydrogen peroxide, peracetic acid, potassium permanganate, or benzoyl peroxide. FIG. 4 illustrates the formation of the polyisobutylene diol from the polyisobutylene dialkyl borane by oxidation with hydrogen peroxide. In some embodiments, the oxidation takes place in an alkaline environment created by the addition of a base, for example, sodium hydroxide or potassium hydroxide.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

Example

Synthesis of Polyisobutylene (PIB) Diol

Hindered dicumyl ether was combined with anhydrous hexane and 2,6-di-tert-butylpyridine in a reactor. Methyl chloride (MeCl) and isobutylene were added to the reactor through a cooling coil cooled to −80° C. The solution was stirred and kept at −80° C. by a liquid nitrogen-cooled jacket or coil in the reactor. Polymerization was initiated by adding titanium tetrachloride to the reactor to form polyisobutylene dichloride (FIG. 1). After 30 minutes, allyltrimethylsilane was added to the reactor to introduce an allyl group to the end of the polymer chains in an end-capping reaction (FIG. 2). After 2 hours, the reactions were terminated by the addition of methanol (MeOH) at −80° C. The resulting solution was stirred at 25° C. overnight until the MeCl evaporated completely. The resulting polymer was washed with a sodium chloride water solution. Aqueous waste from the bottom layer in the reactor was drained and followed by multiple deionized water washes until the pH of the aqueous layer was neutral. After the final wash, a large amount of MeOH was added to the reactor to precipitate the polymer. The resulting polymer was transferred to a distillation flask, mixed with toluene, and dried by azeotropic distillation of dry toluene to produce polyisobutylene diallyl (telechelically allyl-terminated polyisobutylene).

In a three-necked 2000 mL round bottomed flask equipped with magnetic stirring, a dry nitrogen blanket, an ice bath, a rubber septum, and a digital thermocouple, 10.66 g of the polyisobutylene diallyl (0.005 moles, molecular weight of 2,000 Da) was dissolved in 605 mL of anhydrous THF. Sodium borohydride in an amount of 0.605 g (0.016 moles) was added to the polyisobutylene diallyl in the flask and allowed to dissolve with the aid of stirring. After the resulting solution had equilibrated at 0° C., an aliquot of 0.8523 g (0.016 moles) of concentrated sulfuric acid was added to solution in the flask dropwise using a syringe, resulting in the liberation of hydrogen gas and the formation of polyisobutylene dialkyl borane (FIG. 3). The solution was brought to room temperature and then quenched with 16 mL of an aqueous 3N NaOH solution (0.016 moles). The quenched solution including the polyisobutylene dialkyl borane was then treated with 1.81 mL of 30% $H_2O_2$ (0.016 moles), and allowed to react for 12 hours to form polyisobutylene diol (FIG. 4). The solution was then extracted with 500 mL of hexane and a 50 mL solution including 3.326 g of sodium bisulfite (0.031 moles) to quench any unreacted peroxides. The mixture was transferred to a separation funnel and the aqueous layer was removed. The hexane solution was washed three times with deionized water. The organic solution was then stripped using rotary evaporation, yielding a clear, viscous oil.

Proton nuclear magnetic resonance spectroscopy of the clear, viscous oil confirmed the presence of 1-hydroxylpropyl terminated end groups, thus confirming the synthesis of polyisobutylene diol.

We claim:

1. A method for making a polyisobutylene diol, the method comprising:
   providing a polyisobutylene diallyl;
   hydroborating the polyisobutylene diallyl by combining in situ the polyisobutylene diallyl with a borane-coordinating solvent, an alkaline metal salt of borohydride, and an acid to produce a polyisobutylene dialkyl borane, wherein the alkaline metal salt of borohydride is combined with the polyisobutylene diallyl before the acid is combined with the polyisobutylene diallyl, wherein the acid includes at least one selected from the group of sulfuric acid, hydrochloric acid, hydroiodic acid, and hydrobromic acid; and
   oxidizing the polyisobutylene dialkyl borane to form the polyisobutylene diol.

2. The method of claim 1, wherein the alkaline metal salt of borohydride includes at least one of sodium borohydride, potassium borohydride, and lithium borohydride.

3. The method of claim 1, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

4. The method of claim 1, wherein providing the polyisobutylene diallyl includes:
   providing a polyisobutylene dichloride; and
   reacting the polyisobutylene dichloride with allyltrimethylsilane to produce the polyisobutylene diallyl.

5. The method of claim 1, wherein oxidizing the polyisobutylene dialkyl borane to form the polyisobutylene diol includes combining a base and an oxidizer with the polyisobutylene dialkyl borane.

6. The method of claim 5, wherein the oxidizer is at least one of hydrogen peroxide, peracetic acid, potassium permanganate, and benzoyl peroxide.

7. The method of claim 5, wherein the base includes at least one of sodium hydroxide and potassium hydroxide.

8. A method for making a polyisobutylene diol, the method comprising:
   providing a polyisobutylene dichloride;
   reacting the polyisobutylene dichloride with allyltrimethylsilane to produce a polyisobutylene diallyl;
   hydroborating the polyisobutylene diallyl by combining in situ the polyisobutylene diallyl with a borane-coordinating solvent, an alkaline metal salt of borohydride, and an acid to produce a polyisobutylene dialkyl borane, wherein the alkaline metal salt of borohydride is combined with the polyisobutylene diallyl before the acid is combined with the polyisobutylene diallyl, wherein the acid includes at least one selected from the group of sulfuric acid, hydrochloric acid, hydroiodic acid, and hydrobromic acid; and
   combining a base and an oxidizer with the polyisobutylene dialkyl borane to form the polyisobutylene diol.

9. The method of claim 8, wherein the alkaline metal salt of borohydride includes at least one of sodium borohydride, potassium borohydride, and lithium borohydride.

10. The method of claim 8, wherein the borane-coordinating solvent includes at least one of tetrahydrofuran, diethyl ether, dimethoxyethane, diethylene glycol dimethyl ether, triethylene glycol dimethyl ether, and tetraethylene glycol dimethyl ether.

11. The method of claim 8, wherein the oxidizer is at least one of hydrogen peroxide, peracetic acid, potassium permanganate, and benzoyl peroxide.

12. The method of claim 8, wherein the base includes at least one of sodium hydroxide and potassium hydroxide.

13. A method for making a polyisobutylene diol, the method comprising:
   providing a polyisobutylene dichloride;
   reacting the polyisobutylene dichloride with allyltrimethylsilane to produce a polyisobutylene diallyl;
   hydroborating the polyisobutylene diallyl by combining in situ the polyisobutylene diallyl with tetrahydrofuran, an alkaline metal salt of borohydride, and an acid to produce a polyisobutylene dialkyl borane, wherein the alkaline metal salt of borohydride is combined with the polyisobutylene diallyl before the acid is combined with the polyisobutylene diallyl, wherein the acid includes at least one selected from the group of sulfuric acid, hydrochloric acid, hydroiodic acid, and hydrobromic acid; and combining hydrogen peroxide and at least one of sodium hydroxide and potassium hydroxide with the polyisobutylene dialkyl borane to form the polyisobutylene diol.

14. The method of claim 13, wherein the alkaline metal salt of borohydride includes at least one of sodium borohydride, potassium borohydride, and lithium borohydride.

* * * * *